March 9, 1948.  O. SCHLÄPFER  2,437,483
DIESEL-ELECTRIC VEHICLE WITH AUTOMATIC FIELD
WEAKENING OF THE DRIVING MOTORS
Filed March 7, 1945
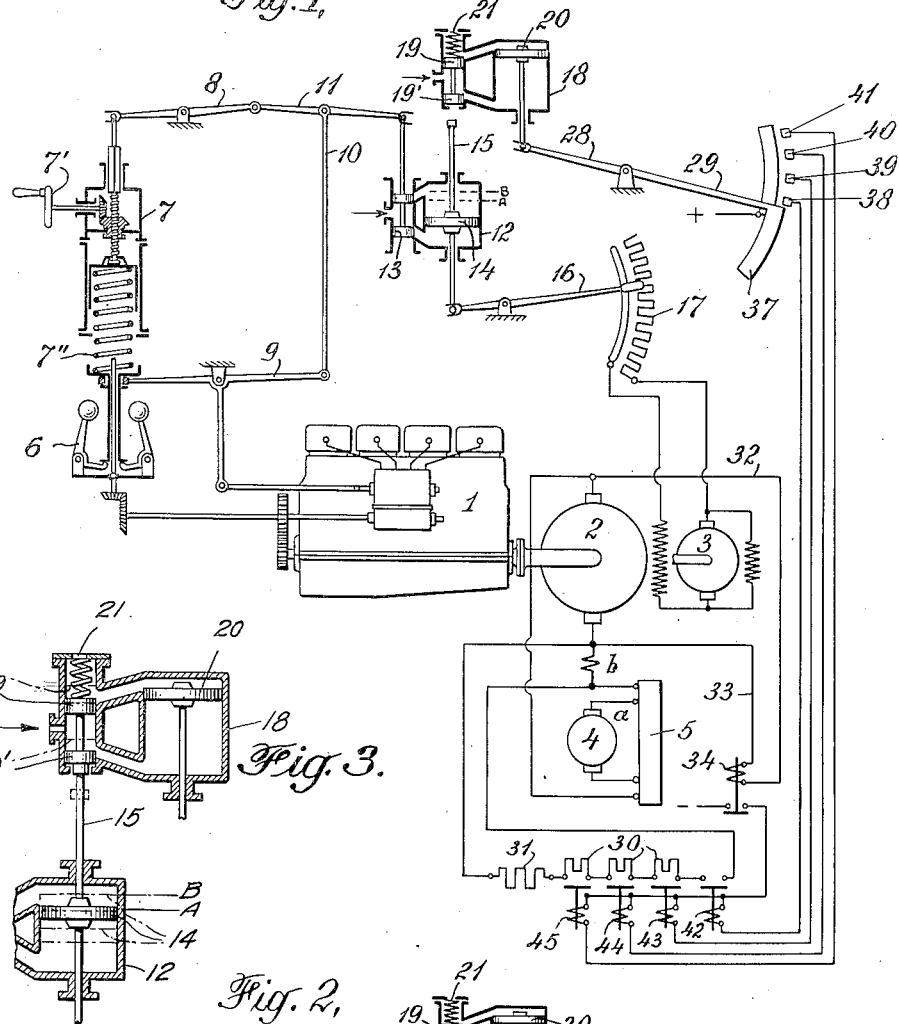
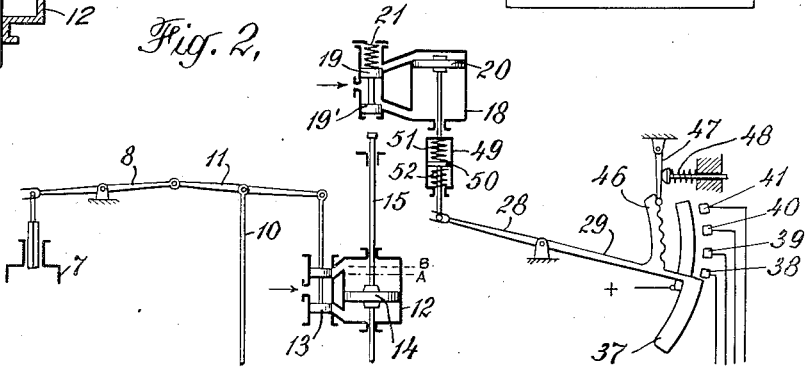
INVENTOR
OSCAR SCHLÄPFER
BY
ATTORNEYS

UNITED STATES PATENT OFFICE 2,437,483

DIESEL-ELECTRIC VEHICLE WITH AUTOMATIC FIELD WEAKENING OF THE DRIVING MOTORS

Oscar Schläpfer, Winterthur, Switzerland, assignor to Sulzer Frères, Société Anonyme, Winterthur, Switzerland Application March 7, 1945, Serial No. 581,473
In Switzerland March 9, 1944

3 Claims. (Cl. 290—17)

The invention relates to control apparatus for a Diesel-electric power plant used for the propulsion of a vehicle. In particular, it relates to control apparatus of the type in which a servomotor adjusting the weakening of the fields of the driving motors is controlled in accordance with the field regulator adjusting the excitation of the main generator to maintain a predetermined constant load on the Diesel engine at a constant speed, and in which the regulators for regulating the fields of the main generator and of the driving motors are designed for instance as astatic regulating members and the control member of the driving motor regulator has in its closed position so great a degree of overlapping that the field regulator of the generator can move, in the neighbourhood of the position for short-circuited resistance, without bringing this control member out of its closed position, over such a large range that the change of load presenting itself within this range is at least as great as the change of load caused by the greatest step of the field weakening.

According to this invention the servomotor which effects the weakening of the field of the driving motors operates a switch which controls the apparatus of the field weakening circuit which switches the power. Thus the regulator for the fields of the driving motors is divided up into apparatus for switching in and out the working circuits and means for controlling that apparatus. The part of the regulator for the fields of the driving motors which serves for this control may be made so that when passing from one position to the next it will move in jerks and only come to rest when it has moved fully to the required positions.

In the use of driving motors of high power or with great field weakening, it is necessary in some circumstances to increase the number of steps of the field weakening regulator considerably in order that this regulator may still be able to master the power to be switched per step. In order to avoid this disadvantage it is proposed in the present improvement not to operate the switch apparatus for regulating the field weakening directly by the servomotor which is controlled by the generator field regulator, but to control with this only switches particularly designed for switching out high powers. Not only does this give greater reliability in service but the maintenance of the contacts also gives less work. Moreover, it is possible to manage with a smaller number of steps.

In order that unnecessary switching in and out of relays, caused only by bad contacts, may be rendered impossible, it is expedient to provide a catch device between the servomotor and the control switch for the power switch, in order that the control switch may only take up definite positions. This catch device may for instance be a ratchet which only comes to rest when a pawl snaps into place, or it may be a notched plate relatively to which the control switch can only move when the servomotor has covered a certain distance and has thereby loaded a spring.

Figure 1 shows by way of example an arrangement according to the invention without such a catch device.

Figure 2 shows an arrangement in which a catch device is provided.

Figure 3 shows diagrammatically in enlarged detail the cooperation between rod 15 and valve 19 in Figures 1 and 2.

As described in the specification of the application of Oscar Schläpfer Serial No. 554,892, filed September 20, 1944, an internal combustion engine 1 drives a main generator 2 and an auxiliary generator 3. For purposes of simplicity only one of the driving motors 4 is here shown. Apparatus 5 is provided for reversing direction of travel and for interrupting the main circuit. The governor 6, its speed adjusting device 7, the linkage 8—11, the field regulator 12—17 of the main generator are also as described in the application No. 554,892, likewise the servomotor 18—21 of the field regulator of the driving motors. The contact lever 29, however, does not switch the resistances 30 in and out directly, but with the aid of a contact piece 37 control current is supplied to the contacts 38—41, whereby the contactors 42—45 are actuated. The latter close the field weakening circuit of the driving motor field 4b, bridging the resistances 30 in this circuit.

Instead of the relay 34 which is connected through the lines 32 and 33 to the main generator 2 as described in the application No. 554,892, the element here denoted 34 is a relay which interrupts the circuit of the contactors 42—45 and thus renders impossible any field weakening when the field regulator 12 has cut out the resistance 17, but the generator voltage has not reached the value at which the starting of field weakening is desired.

The operation of the devices shown in Figure 1 is the following: When the field regulator piston 14, in the process of successively cutting out the resistances 17, has reached the position A, the rod 15 begins to lift the valve 19 from its lower stop 19′. Previously the pressure oil supply to the lower side of the piston 20 was free, the piston was thus in its upper end position and the contact piece 37 was not in contact with any one of the contacts 38—41. The valve 19 now closes the oil supply to the piston 20 and as soon as the piston 14 has roughly arrived at the position B the valve 19 opens the supply to the upper side of the piston 20, which moves downwards, while the lever 29 moves upwards, so that the piece 37 is brought over the contact 38 and closes the actuating circuit to the contactor 42, whereupon the latter closes the field weakening circuit parallel to the driving motor field 4b.

In this way the current absorbed by the driving motors 4 increases, the engine 1 is overloaded, and the field regulator 12 reduces the voltage of the generator 2 by switching in a part of the resistance 17. Now according to the application No. 554,892 the steps of the resistances 17 and 30 are so adapted to each other that the increase of load caused by switching in the contactor 42 or by the short-circuiting of one of the resistance steps 30 is smaller than the reduction of load brought about by the field regulator 12 when the rod 15 moves so far downwards that the valve 19 thus frees once more the oil supply to the lower side of the piston 20.

If now the speed of travel rises, the field regulator piston 14 again moves towards the position for cut out resistance, and if the rod 15 has risen sufficiently, the piston 20 moves further downwards, the contact 39 receives current and the contactor 43 is closed. Thus the first step of the resistance 30 is short-circuited, the current in the field-weakening circuit and thus in the armature of the driving motor 4 increases. The load on the engine thus rises again and the same process is repeated from step to step.

When the inertia of the contactors 42—45 is small and the driving motor current adapts itself quickly to the new conditions it is possible that the field regulator 12 reacts instantaneously when the contact piece 37 only lightly touches one of the contacts 38—41. For such cases a design as shown in Figure 2 is expedient. On the lever 29 is arranged a ratchet device 46—48 which ensures that the contact piece 37 can only take up definite positions, namely, those in which it has moved completely on to one of the contacts 38—41. Furthermore there is provided between the piston 20 and the lever 28 a spring member 49—52 which permits a certain relative displacement between the piston 20 and the lever 28.

The method of working is the following: When the piston 20 moves downwards in the manner described above, the spring 51 is compressed between the casing 49 and the plate 50, while the unloaded spring 52 lifts away. The loading of the spring 51 continues until the torque is sufficient to bring the lever 47 out of the notch. The contact piece 37 then moves suddenly upwards until it is caught by the next notch, where the springs 51 and 52 are in an unloaded state. Should the lever 29 move somewhat beyond the next notch on account of its momentum, it is returned by the then loaded spring 52. The right functioning of the catch movement is purely a matter of choosing the elasticity characteristics of the springs 48, 51 and 52.

In place of the notched piece 46 a toothed ratchet may be used, which, by means of suitable locking, allows the field weakening switch to continue motion until a catch member has engaged the next tooth of the ratchet.

I claim:

1. A Diesel-electric vehicle comprising a Diesel engine, a speed governor driven by the engine, electric current generating means driven by the engine, a regulating resistance in a field circuit of the generating means for regulating the output voltage of the generating means, a servomotor influenced by the speed governor and controlling the regulating resistance in such manner that the Diesel engine is always loaded to a predetermined value, at least one electric traction motor receiving current from the current generating means, a number of resistances each being connectable to and disconnectable from a field circuit of the traction motor for weakening that field, a number of switches associated individually with said resistances for connecting and disconnecting them from the field circuit, a second servomotor influenced by the first servomotor only when said first servomotor is in or near its end position for cutting out the regulating resistance of the generating means, and a contact device controlled by said second servomotor having a movable contact and several fixed contacts arranged in succession each of which controls one of said switches.

2. A Diesel-electric vehicle according to claim 1 in which said contact device is provided with means whereby its movable contact can be at rest only when in full contact or out of contact with a fixed contact.

3. A Diesel-electric vehicle according to claim 1 in which said second servomotor is connected to said contact device through a spring means and notched ratchet means are provided for bringing the movable element of said contact device to rest only when in full contact or out of contact.

OSCAR SCHLÄPFER.

REFERENCES CITED

The following references are of record in the file of this patent:

UNITED STATES PATENTS

| Number | Name | Date |
|--------|------|------|
| 786,376 | Nilson | Apr. 4, 1905 |
| 1,900,706 | Godsey, Jr. | Mar. 7, 1933 |
| 2,131,527 | Sousedik | Sept. 27, 1938 |
| 2,145,611 | Schlaepfer | Jan. 31, 1939 |
| 2,256,294 | Schlaepfer | Sept. 16, 1941 |
| 2,318,043 | Austin | May 4, 1943 |